United States Patent [19]
Pöyhönen

[11] Patent Number: 5,570,352
[45] Date of Patent: Oct. 29, 1996

[54] DIGITAL CELLULAR NETWORK/SYSTEM WITH MOBILE STATIONS COMMUNICATING WITH BASE STATIONS USING FREQUENCY-HOPPING AND HAVING ENHANCED EFFECT OF INTERFERENCE DIVERSITY

[75] Inventor: Petri Pöyhönen, Espoo, Finland

[73] Assignee: Nokia Telecommunications Oy, Espoo, Finland

[21] Appl. No.: 331,518

[22] PCT Filed: May 6, 1993

[86] PCT No.: PCT/FI93/00195

§ 371 Date: Feb. 17, 1995

§ 102(e) Date: Feb. 17, 1995

[87] PCT Pub. No.: WO93/22849

PCT Pub. Date: Nov. 11, 1993

[30] Foreign Application Priority Data

May 6, 1992 [FI] Finland .................................. 922046

[51] Int. Cl.⁶ .................................................. H04J 13/00
[52] U.S. Cl. .............................. 370/18; 370/50; 370/95.1; 375/200; 375/202; 375/206; 379/58; 379/59; 455/33.1
[58] Field of Search ............................... 370/50, 95.1, 18, 370/19; 375/200, 202, 205, 206; 379/58, 59, 60, 61; 455/33.1, 33.2, 33.4

[56] References Cited

U.S. PATENT DOCUMENTS

| | | | |
|---|---|---|---|
| 4,479,226 | 10/1984 | Prabhu et al. | 375/1 |
| 4,554,668 | 11/1985 | Deman et al. | 375/1 |
| 4,799,252 | 1/1989 | Eizenhoffer et al. | 379/59 |
| 4,866,710 | 9/1989 | Schaeffer | 370/95.1 |
| 5,040,238 | 8/1991 | Comroe et al. | 455/33.4 |
| 5,193,101 | 3/1993 | McDonald et al. | 455/33.4 |
| 5,224,121 | 6/1993 | Schorman | 455/33.1 |
| 5,257,398 | 10/1993 | Schaeffer | 455/33.1 |
| 5,319,796 | 6/1994 | Grube et al. | 455/33.4 |
| 5,402,413 | 3/1995 | Dixon | 370/18 |

FOREIGN PATENT DOCUMENTS 9016122 12/1990 WIPO.
9113502 9/1991 WIPO.

Primary Examiner—Douglas W. Olms
Assistant Examiner—Shick Hom
Attorney, Agent, or Firm—Cushman Darby & Cushman, L.L.P.

[57] ABSTRACT

A digital TDMA/FDMA (Time Division Multiple Access/Frequency division Multiple Access) cellular network system, suitable for a microcellular network and to maximize the advantage to be gained from interference diversity, including base stations forming radio cells, each having a determined static frequency of a channel of the cell and including a first transceiver continuously transmitting control data of the system concerning the cell at the control channel frequency, at least in one predetermined time slot of a TDMA frame. The TDMA frame of the first transceiver includes traffic channels at least in a part of the other time slots. Each base station further includes at least one second transceiver for the traffic channels. The system further includes mobile stations connected to the base stations via a radio path. The traffic channels of the second transceiver units use frequency-hopping, at least in a part of the radio cells, in such a way that, on those traffic channels aligned with the predetermined time slots of the control data of the cell in the first transceiver, substantially all frequencies of the available frequency band, except the control data transmission frequency determined for the cell, belong to the hopping sequence. On those traffic channels which are in the other time slots, substantially all frequencies of the available frequency band belong to the hopping sequence.

9 Claims, 3 Drawing Sheets

DIGITAL CELLULAR NETWORK/SYSTEM
WITH MOBILE STATIONS
COMMUNICATING WITH BASE STATIONS
USING FREQUENCY-HOPPING AND
HAVING ENHANCED EFFECT OF
INTERFERENCE DIVERSITY

BACKGROUND OF THE INVENTION

The invention relates to cellular network systems with mobile stations communicating with base stations using frequency-hopping, and having an enhanced effect of interference diversity. The cellular-network systems according to the invention may conform to the GSM system known per se, for instance.

New requirements arise when mobile phone services are offered in urban population centres: the system is supposed to have a large capacity, base station equipment should be small-sized because of the very limited possibilities of providing equipment rooms in urban areas, and the system should operate on low radio power levels to make small-sized subscriber's units possible. Moreover, the system is expected to cover also the interiors of buildings, and to offer a good coverage in spite of the fact that it is difficult to predict the radio coverage of antennas to be positioned at low elevations. In addition to the above, the system is supposed to offer easier frequency planning of a radio network than before. Such cellular networks are built of so-called short-range microcells.

To build a mobile phone network in an environment as described above is a task very different from realizing a classic cellular network. While the primary object of a cellular network is to minimize the number of base station sites by increasing the range of the cells to the technical maximum and by installing the maximum number of transceiver units permitted by the frequency band of the network on each base station site, the primary object of microcellular networks is to achieve low radio powers and small installation units suitable for outdoor deployment.

However, conventional cellular technique (cell splitting) does not meet the requirements of a microcellular network. This is due to the fact that with the cell radius decreasing and the radio coverage at the same time becoming more difficult to predict than before (because antennas are positioned below roof-tops to restrict the cell size) either the overlapping of the cells increases or the coverage of the system is compromised (depending on a shadowing caused by buildings or natural obstacles in each direction). An increasing degree of overlapping of the cells makes it necessary to widen the reuse pattern, which eliminates at least part of the additional capacity supposed to be obtained by means of cell splitting.

SUMMARY OF THE INVENTION

The object of the present invention is thus to provide a digital TDMA/FDMA (Time Division Multiple Access/Frequency Division Multiple Access) cellular network system, e.g. a TDMA/FDMA cellular system according to the GSM system, in order to comply with the above requirements for a microcellular network. This is achieved by means of a cellular network system according to the present invention.

The basic idea of the invention is to give up classic cell planning, according to which a part (particular frequencies) of a frequency band available is allocated to each cell, and to utilize instead (within the scope of the restrictions placed by the other properties of the system) substantially the full available frequency band in as many cells as possible, preferably in all cells of the system.

The difference between the idea of the invention and that of the prior art may be described more accurately as follows. Conventional cell planning tries to find the densest reuse pattern, by means of which a limited available frequency band can be effectively utilized (the denser the reuse pattern, the greater the capacity). This takes place in such a way that the number (K) of the coverage areas (cells or sectors) of a reuse pattern is first derived from the minimum required for C/I (carrier-to-interference ratio) of the system the (GSM system requires 9 dB, for instance). The available frequency band is then divided evenly among the coverage areas. The basis for the present invention is a very different idea: cell planning is simplified by choosing the number (K) of the coverage areas of the reuse pattern to equal with the number of available carriers on the frequency band. The capacity of the system is then increased by adding frequency-hopping transceivers, each of which is hopping across the whole width of the frequency band. The collision probability can thus be spread over the whole area of the reuse pattern.

The solution of the invention also enables the considerable advantage that the frequency-hopping sequences to be used in different cells need not be mutually synchronized, which means that there is no need to time-synchronize the cells, i.e. TDMA frames need not be transmitted synchronously and at the same mutual timing. On the other hand, the invention makes it possible to utilize also the time synchronization between cells for a selective reduction of collision load on control channels, as is described in greater detail later.

In the present invention, the known frequency-hopping property of the known GSM system is thus utilized in a novel way, in other words in such a way that substantially the whole frequency band of the system is included in the hopping sequences of the cells. A frequency-hopping chain of all cells then includes the same frequencies, i.e. all frequencies of the system (with certain exceptions due to the other properties of the system).

According to the frequency-hopping principle, the transmission frequency is changed throughout the transmission of a signal and the receiving frequency during reception, respectively, by using a suitable number of frequencies, e.g. four predetermined frequencies. These frequencies form a so-called hopping sequence. Within one cell, the hopping sequences are mutually synchronized (collisions do not occur between the channels of any one single cell) and non-correlated among cells sharing the same allocated frequencies. In the GSM system, frequency-hopping is an optional feature for a base station and an obligatory one for a mobile station.

Two kinds of advantages are gained from the use of frequency-hopping, namely so-called frequency and interference diversity effects. The desirable effect of frequency diversity is based on the fact that fading conditions are mutually uncorrelated across consequent time slot occurrences, when the frequency of a radio connection is changed sufficiently from one time slot to another. Even stationary (or slowly moving) users, which for a certain frequency are in a fading notch, are then regularly also in a strong field on some other carriers belonging to the hopping sequence. On the other hand, the useful effect of interference diversity is caused by the mutual uncorrelatedness of the hopping sequences, i.e. by the fact that the frequency-hopping sequences of the base stations using the same or nearby frequencies are mutually different, whereby connections interfering each other change when moving from one time slot to another. In this way, the influence of strong interference sources is averaged over several channels. The radio system and frequency-hopping of the GSM system are described in greater detail in Recommendation GSM 05.01 "Physical Layer on the Radio Path: General Description."

Due to the solution provided by the present invention, the benefit from interference diversity can be exploited to its full potential. Because the system of the invention reuses substantially all frequencies, preferably in all cells, an increasing degree of overlapping of the cells in a denser-becoming cellular network does not make it necessary to relax the reuse pattern (because the interference is only momentary), which brings a distinct advantage of capacity compared to conventional solutions.

BRIEF DESCRIPTION OF THE DRAWINGS

In the following, the invention and its preferred embodiments will be described in greater detail referring to the examples according to the attached drawings illustrating a GSM network, in which:

FIG. 1 illustrates a cellular network system within the area of one radio cell. A base station 11 forms a radio cell of its own and serves subscribers 12 moving in the area of this cell and being in connection with their base station via a radio path. The base station comprises at least two, in this case four transceiver units, which are indicated by reference marks TRX1 . . . TRX4. The outputs of the transmitters are connected to a combining element 13 at radio frequency, which element connects the transmitters of the transceivers to a common transmitting antenna 14 and the receivers of the transceivers to a common receiving antenna 15. The combining element 13 is a wideband combiner suitable for being used in association with frequency-hopping transceivers. Because of the losses of a wideband combiner, the number of transceivers to be connected to the same antenna is limited.

The base station further comprises several baseband signal processing units 16a to 16d, which produce baseband modulating signals for the transceiver units TRX1 . . . TRX4. In the signal processing units, the data to be transmitted is coded and positioned into a frame structure. Between the signal processing units and the transmitters, there is a switching field 17 connecting the baseband signals to be transmitted to the transmitters and the signals to be received to the signal processing units, respectively.

One of the transceiver units of the base station (in this case the transceiver unit TRX1) transmits on a BCCH/CCCH channel. The transmission frequency (BCCH/CCCH frequency) of this transceiver unit is fixed in each cell. The BCCH/CCCH channel will be described more closely below.

Because the number of transceivers to be equipped for the cells of the system is smaller than the number of the channels of the system, hopping synthetizers are used in the transceivers of the cellular network system according to the invention.

The cellular network naturally comprises also other components, but because the basic structure of the network is known per se, it will not be described more closely in this connection. As to the basic structure of a GSM network, reference is made e.g. to Recommendation GSM 01.02 "General Description of a GSM PLMM".

Figure 2:
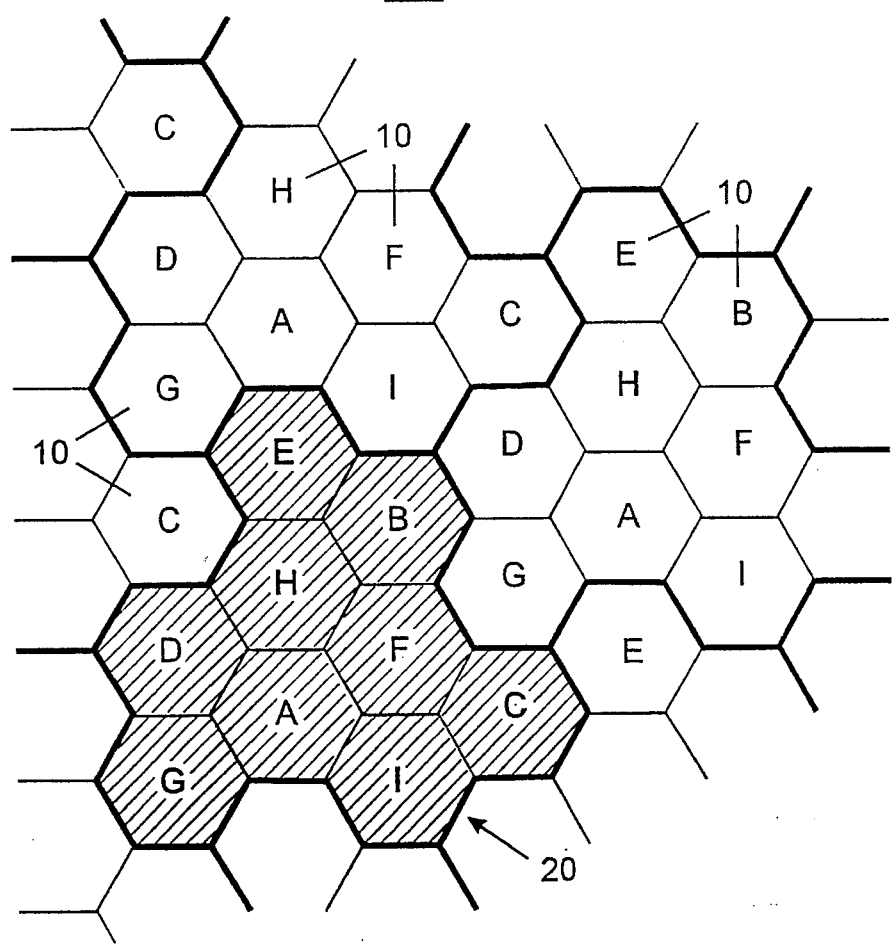
FIG. 2 shows schematically a reuse of frequencies in a case known per se, in which a cellular structure consists of a reuse pattern of 9 cells.

In FIG. 2, the cellular network system is shown as a combination of ideal hexagons, each of which represents one cell 10. According to conventional frequency planning, hexagons are formed in a known manner to reuse patterns, to so-called clusters, in which clusters 20 typically comprise, e.g., 9 cells, as shown in FIG. 2. Frequencies available are divided among the cells of a cluster and respective frequencies are reused again in the respective cells of the next cluster. In FIG. 2, the frequency combination of each cell is indicated by reference marks A to I. For instance, on a 12.5 MHz band with 62 available carrier frequencies, the difference between the carriers being 200 kHz, six or seven frequencies are allocated to each cell from the frequency band.

One of the control channels of the GSM system is a Broadcast Control CHannel BCCH, which is a unidirectional channel from the base station to the mobile stations. Another control channel of the GSM system is a Common Control CHannel CCCH, which is used for establishing a signalling connection only. The BCCH and CCCH channels occurring at the same carrier frequency share one time slot in a multiframe structure of 51 frames. A BCCH/CCCH carrier consists of a TDMA frame of 8 time slots. One of the time slots is used commonly by the BCCH and CCCH channels (as well as by a frequency correction channel FCH and a synchronizing channel SCH) (51 multiframe). The other time slots of the BCCH/CCCH carrier may be traffic channels.

Even though a power control as per channel (as per time slot) is known in the GSM system, the BCCH/CCCH carrier must transmit at maximum power in all time slots, because the mobile stations monitor the surrounding cells after having read the frequencies of the neighbouring cells from their active cell. A mobile station can measure the level of the neighbouring cells only momentarily, due to which there is no guarantee that the measurement occurs exactly in the time slot comprising the BCCH/CCCH channel. For this reason, the cell must transmit this frequency in all time slots at fixed (maximum) power. The mobile station utilizes these measuring data in order to conclude, whether the field strength of some other cell is so much stronger that it is worthwhile abandoning the present cell and beginning to listen to the call channel of a new cell. A similar monitoring controls a handover process, when the mobile station is in an active state, in other words, in the case of a call.

Because one time slot (BCCH/CCCH time slot) of the BCCH/CCCH carrier is shared (within the scope of the multiframe structure) also by other control channels (frequency correction channel FCH and synchronizing channel SCH), the references to the BCCH or CCCH channels shall be understood to concern generally also other control channels of a similar type (common in a cell). (These control channels are described in greater detail e.g. in the above-mentioned Recommendation GSM 05.01).

Consequently, each cell 10 of the GSM system comprises a transmitter (such as a beacon) at a fixed frequency and with a permanently constant power, on the basis of which the mobile stations can, for instance, decide to which of the available cells they stick in an idle state. On grounds of measurements of the neighbouring cells, the system makes a decision on a handover of a mobile station in a call state. Consequently, no hopping synthetizer can be used at the BCCH/CCCH frequency of a cell (whereby the BCCH/CCCH channel could be seen only at intervals at the frequency allocated to that cell).

On account of the described properties of the GSM system, the main principle of the present invention (the transceivers use frequency-hopping in such a way that substantially all frequencies of an available frequency band belong to the hopping sequences) has been varied in such a manner that conventional frequency planning is applied to the BCCH/CCCH frequencies of the cells, which means that the control carrier has a predetermined fixed frequency in each cell. Differing from the conventional frequency planning, the system according to the invention does not, however, require the maximum capacity of the cluster to be reused (because only one BCCH/CCCH frequency is allocated to each cell), and therefore, the cluster size preferably is the same as the number of radio frequencies available in the system. Consequently, on a 12.5 MHz band, for instance, the size of the cluster can be 62 cells, if the difference between the carriers is 200 kHz. Frequency planning can be very much simplified by such a large cluster size, in spite of the irregular radio coverage of the cells.

Figures 3, 4:
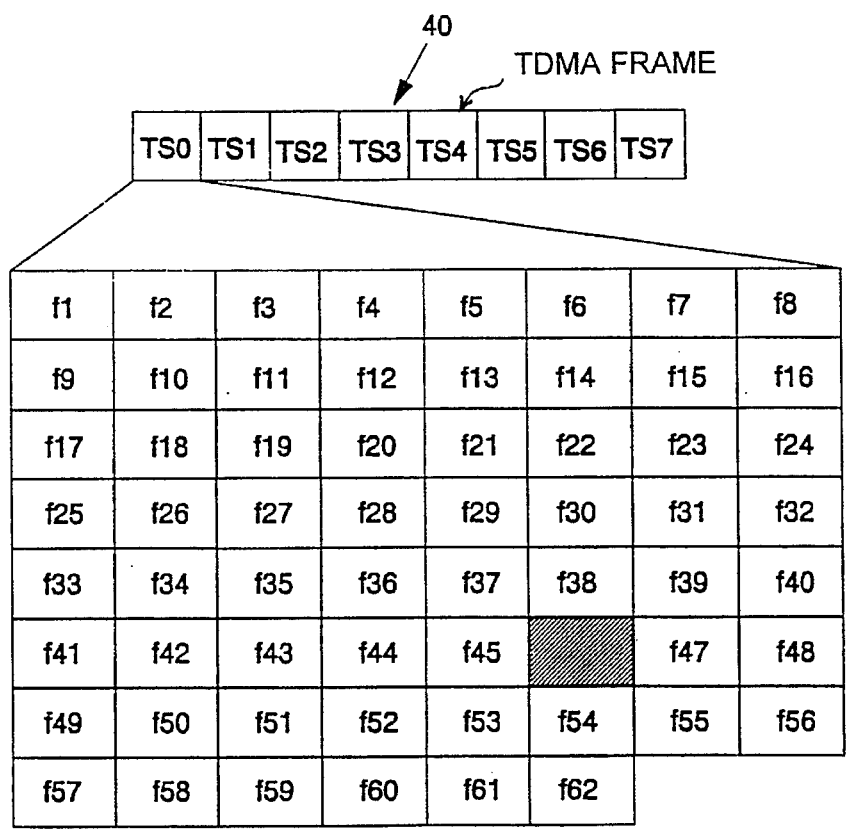
FIG. 3 shows schematically an allocation of BCCH/CCCH frequencies in the cellular network system according to the invention.
FIG. 4 shows schematically frequencies used in one cell of the cellular network system according to a first embodiment of the invention in a time slot corresponding to a BCCH/CCCH time slot.

FIG. 3 shows schematically the allocation of the BCCH/CCCH frequencies in a case similar to that described above, in which the cluster size is 62 cells. The cells of the cluster are indicated by reference marks C1 to C62. The BCCH/CCCH frequency of the cell C1 is f1, the BCCH/CCCH frequency of the cell C2 is f2, etc., and the BCCH/CCCH frequency of the last cell C62 is f62.

As mentioned above, the frequency of the BCCH/CCCH channel cannot hop, but the transmitter in question transmits at a fixed frequency and at constant power in all time slots of a TDMA frame. Respectively, in order to protect the BCCH/CCCH channel from other frequencies hopping according to the invention, the BCCH/CCCH frequency cannot be present on the frequency-hopping sequences of the other radio channels of the same cell in the time slot corresponding to the BCCH/CCCH time slot of those other radio channels.

Figure 5:
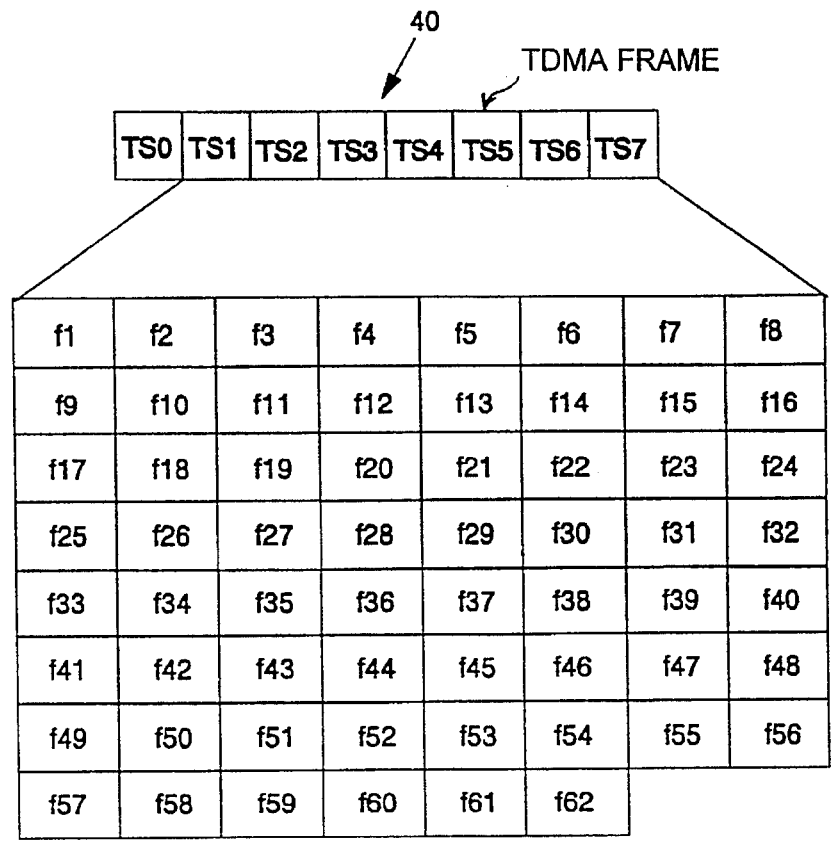
FIG. 5 shows schematically frequencies used in one cell of the cellular network system according to the first embodiment of the invention in the other time slots of a TDMA frame and FIG. 6 shows schematically frequencies used in one cell of the cellular network system according to a second embodiment of the invention.

FIGS. 4 and 5 show this principle schematically.

Figure 1:
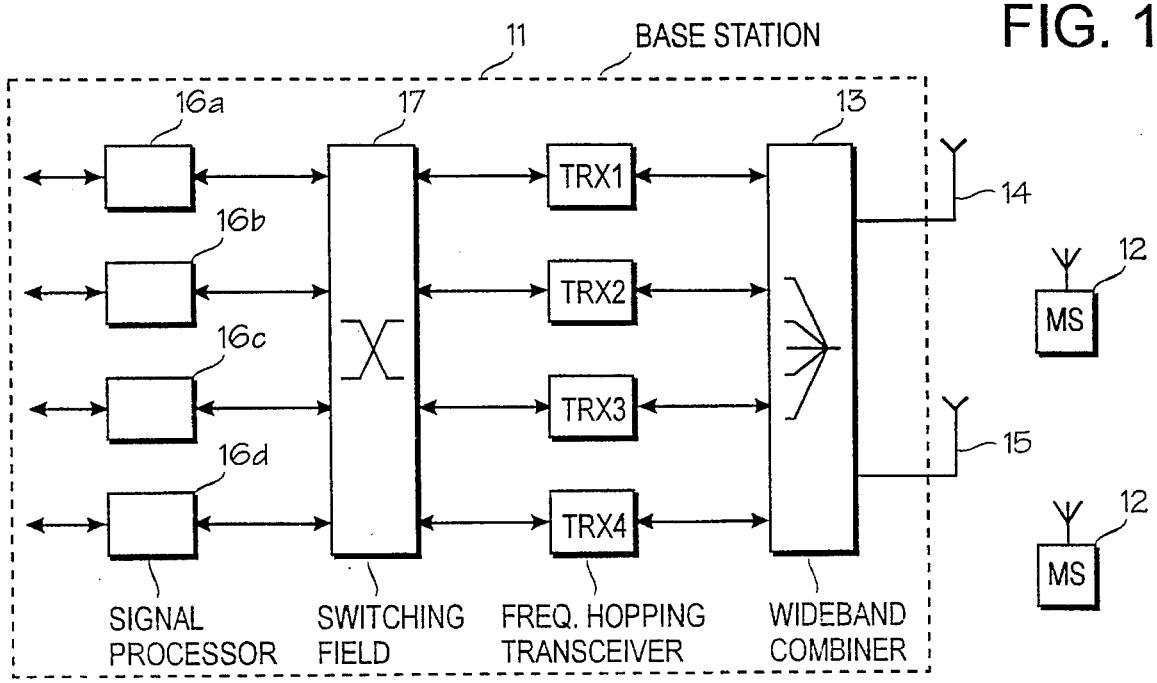
FIG. 1 shows schematically one cell of a cellular network system.

FIG. 4 shows frequencies used by all other transmitters of one cell, in this example case C46, except by the BCCH/CCCH transmitter (transceiver units TRX2 to TRX4 in FIG. 1), in a time slot TS0 corresponding to the BCCH/CCCH time slot and being the first time slot of a TDMA frame 40. As presented above, the BCCH/CCCH frequency of the cell C46 is f46, and each other transceiver unit has the frequencies f1 to f45 and f47 to f62 at its disposal in the time slot TS0 corresponding to the BCCH/CCCH time slot. Consequently, generalized for all cells, this means that the transceivers, except the transmitter operating on the control carrier (BCCH/CCCH), use frequency hopping in the cells of the network in such a way that substantially all frequencies of the available frequency band belong to the hopping sequences, except the frequency of the control carrier of the one cell in the time slot corresponding to the control channel.

According to FIG. 5, each transmitter of the cell C46, except the BCCH/CCCH transmitter, has all the frequencies f1 to f62 at its disposal in all those time slots of the TDMA frame 40 which do not correspond to the BCCH/CCCH time slot (TSN, N≠0). Generalized for all cells, each transceiver unit of each cell, except the BCCH/CCCH transmitter, has all the frequencies at its disposal in these time slots. Consequently, each one of these transmitter units transmits 1/62 of the transmission time of each channel at a certain individual transmission frequency.

In one embodiment of the invention, the other time slots (7 in number) of the BCCH/CCCH carrier, which time slots may be traffic channels, remain at the same fixed frequency and only channels at other frequencies hop as described above. In a second embodiment, the traffic channel time slots of the BCCH/CCCH carrier hop between the BCCH/CCCH transmitter operating at a fixed frequency and the other (hopping) transmitters of the cell in accordance with a local hopping sequence of the cell to be realized in a baseband switching field 17 (FIG. 1), for instance. The switching field 17 connects the respective channels frame by frame to different transceiver units. In this last-mentioned embodiment, in which all channels are treated equally, irrespective of whether they belong to a fixed frequency BCCH/CCCH transceiver unit or to other transceiver units, the interference diversity to be obtained from frequency hopping can be preferably maximized.

Figure 6:
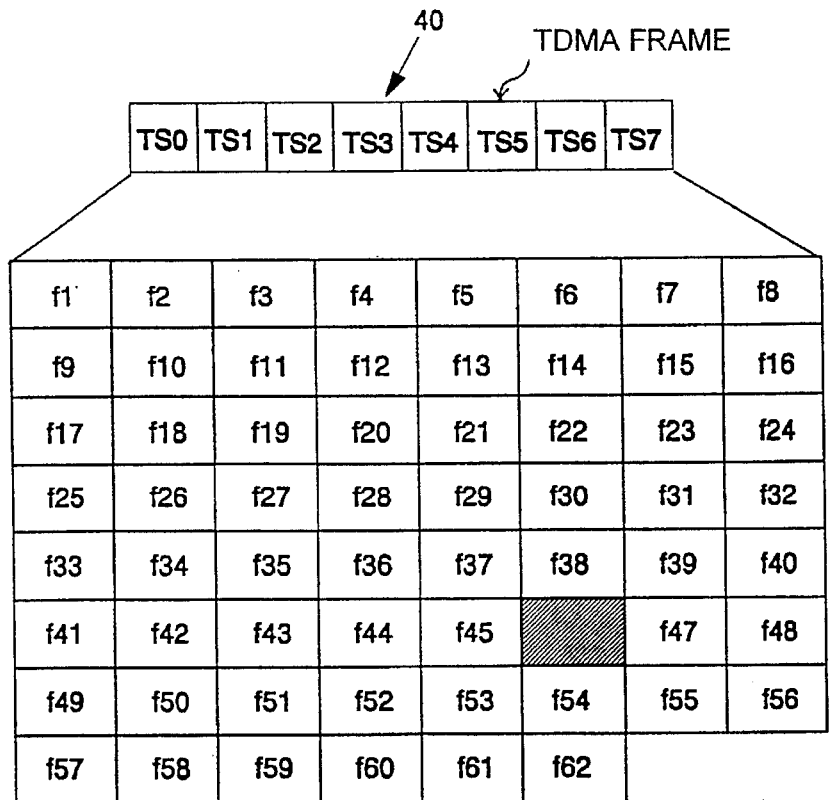

In case the other time slots (7 in number) on the BCCH/CCCH carrier remain at the same fixed frequency, they are exposed to interference from (hopping) frequencies of the other transceiver units. In the above embodiment, the BCCH/CCCH frequency of the one cell has been eliminated from the frequency hopping sequences only in the time slot corresponding to the BCCH/CCCH time slot. This is caused, on the one hand, by the fact that the control channel (BCCH/CCCH channel) is considered to be more critical as far as interference is concerned than an ordinary traffic channel and, on the other hand, by the fact that the interference is only momentary. However, the momentary interference caused by the (hopping) frequencies of the other transceivers to the other channels on the BCCH/CCCH carrier can be entirely eliminated by excluding the BCCH/CCCH frequency of the one cell from the frequency hopping sequences in all time slots (TS0 . . . TS7). This causes, however, a slightly greater loss of capacity, respectively. The last-mentioned alternative is shown in FIG. 6, as far as the cell C46 is concerned.

Moreover, it shall be noted that the above embodiments are such that there is no need to time synchronize the cells with each other.

Moreover, the principle of the invention leads to the fact that the other cells of the system use the BCCH/CCCH frequency of the interfered cell also in the BCCH/CCCH time slot and thus interfere the BCCH/CCCH channel of this cell. However, a consequence of the natural topology of the network is that the most cells are too far away to cause any significant interference. Transmitters of each cell spend 1/62 of the transmission time at the BCCH/CCCH frequency of the interfered cell. It depends on the equipped capacity of the cells and on the prevailing traffic situation, whether the interference level of the BCCH/CCCH channel rises too high.

However, interference tolerance of the BCCH/CCCH channel is improved by the fact that the maximum power of the cell is used on the BCCH/CCCH channel under all circumstances. The other users hopping at the same frequency operate, in most cases, on a lower power level, controlled by power control. Due to this, it is highly probable that the BCCH/CCCH channel copes with collisions without an unreasonable increase of the error ratio. On the other hand, a sufficient amount of frequency resources are placed at the other users' disposal from other frequencies (at which the peak power BCCH/CCCH carrier is topologically farther away), from a more equal situation of competition, so that these users will be able to maintain a sufficient quality of a radio connection.

However, if the interference level of the BCCH/CCCH channel rises too high, in spite of the topological distance mentioned above and differences in the power level, the principle of the invention can be applied in such a way that traffic channels corresponding to the BCCH/CCCH time slot are blocked from being used by the other (hopping) radio channels of the network. In other words, the system does not connect a call to a time slot corresponding to the BCCH/CCCH time slot in cells surrounding the cell which suffers from excessive interference on the BCCH/CCCH channel. In this way, it is possible to reduce selectively, the intensity of collisions occurring on the BCCH/CCCH channels, so that channel coding and interleaving of the system yield a sufficiently low error ratio. This procedure naturally reduces the capacity of the system of the invention, but the reduction is restricted to concern only certain cells and exclusively the BCCH/CCCH time slot (TS0). The last-mentioned embodiment can be varied in principle also in such a manner that only the BCCH/CCCH frequency of the own cell and the frequency or frequencies corresponding to the BCCH/CCCH frequency of one or several other (interfered) cells are eliminated from the frequency-hopping sequences in a time slot corresponding to the BCCH/CCCH time slot. In the two last-mentioned embodiments, the cells shall be mutually time synchronized in such a way that the TDMA frames are transmitted synchronously and at the same mutual timing.

Though the invention has been described above referring to the example illustrated in the attached drawings, it is obvious that the invention is not restricted to that, but it can be modified in many ways within the scope of the inventive idea presented above and in the attached claims.

List of References cited:

(1) Recommendation GSM 05.01 "Physical Layer on the radio path: General description."

(2) Recommendation GSM 01.02 "General Description of a GSM PLMN".

I claim:

1. A digital TDMA/FDMA (Time Division Multiple Access/Frequency Division Multiple Access) cellular network system, comprising:

a plurality of base stations forming respective radio cells; each said base station having a determined static frequency of a control channel of the respective said radio cell, and comprising a first transceiver transmitting control data of said system concerning the respective said radio cell continuously at said determined static frequency, in at least one predetermined time slot of a TDMA frame having a plurality of time slots and including a plurality of traffic channels in at least a part of others of said time slots; at least some of said base stations each further comprising at least one second transceiver for said traffic channels;

a plurality of mobile stations, each effectively connected to a respective said base station via radio; and said system providing a reuse pattern of N radio cells, wherein N is a number corresponding to the total number of carrier frequencies used by all said base stations, each said carrier frequency forming a respective said control channel in a respective one of said radio cells of said reuse pattern, and, in respective radio cells of said reuse pattern, respective said traffic channels of the respective said at least one second transceiver using frequency-hopping sequence such that:

on respective traffic channels within time slots corresponding to each said at least one time slot as is being used for transmitting respective control data of the respective radio cell, substantially all of said carrier frequencies except for the respective said carrier frequency on which control data is being transmitted for the respective said radio cell, belong to said frequency-hopping sequence, and on respective traffic channels within said other time slots, substantially all of said carrier frequencies belong to the frequency-hopping sequence, and respective said frequency-hopping sequences for said radio cells of said reuse pattern being mutually non-synchronous.

2. The cellular network system of claim 1, wherein:

said reuse pattern is provided in each said cell of said system.

3. The cellular network system of claim 1, wherein:

each said first transceiver is arranged to transmit at a respective said determined static frequency in all of said at least one and at least other time slots.

4. A digital TDMA/FDMA (Time Division Multiple Access/Frequency Division Multiple Access) cellular network system, comprising:

a plurality of base stations forming respective radio cells; each said base station having a determined static frequency of a control channel of the respective said radio cell, and comprising a first transceiver transmitting control data of said system concerning the respective said radio cell continuously at said determined static frequency, in at least one predetermined time slot of a TDMA frame having a plurality of time slots and including a plurality of traffic channels in at least a part of others of said time slots; at least some of said base stations each further comprising at least one second transceiver for said traffic channels;

a plurality of mobile stations, each effectively connected to a respective said base station via radio; and said system providing a reuse pattern of N radio cells, wherein N is a number corresponding to the total number of carrier frequencies used by all said base stations, each said carrier frequency forming a respective said control channel in a respective one of said radio cells of said reuse pattern, and, in respective radio cells of said reuse pattern, respective said traffic channels of the respective said at least one second transceiver using frequency-hopping sequence such that:

substantially all of said carrier frequencies, except for the respective said carrier frequency on which control data is transmitted for the respective said radio cell, belong to said frequency-hopping sequence involving all said traffic channels, and respective the frequency-hopping sequences for said radio cells of said reuse pattern being mutually non-synchronous.

5. The cellular network system of claim 4, wherein:

said reuse pattern is provided in each said cell of said system.

6. The cellular network system of claim 4, wherein:

each said first transceiver is arranged to transmit at a respective said determined static frequency in all of said at least one and at least other time slots.

7. The cellular network system of claim 4, further including:

for each said base station having said second transceiver and participating in a respective said reuse pattern, a connector effectively connecting the respective said first transceiver and each respective said second transceiver, in a predetermined sequence, for providing each respective said frequency-hopping sequence.

8. A digital TDMA/FDMA (Time Division Multiple Access/Frequency Division Multiple Access) cellular network system, comprising:

a plurality of base stations forming respective radio cells; each said base station having a determined static frequency of a control channel of the respective said radio cell, and comprising a first transceiver transmitting control data of said system concerning the respective said radio cell continuously at said determined static frequency, in at least one predetermined time slot of a TDMA frame having a plurality of time slots and including a plurality of traffic channels in at least a part of others of said time slots; at least some of said base stations each further comprising at least one second transceiver for said traffic channels;

said predetermined time slot of a TDMA frame being common to all of said radio cells, and all of said radio cells being mutually synchronized such that the TDMA frames of all of said radio cells are transmitted synchronously and with a same mutual timing;

a plurality of mobile stations, each effectively connected to a respective said base station via radio; and for at least some of said radio cells, the respective base stations each including means providing respective said traffic channels of the respective said at least one second transceiver with frequency-hopping sequence, such that:

on respective traffic channels within time slots corresponding to each same respective said at least one time slot as is being used for transmitting respective control data of the respective radio cell, substantially all of said carrier frequencies, except for the respective said carrier frequency on which control data is being transmitted for the respective said radio cell, belong to said frequency-hopping sequence, and on respective traffic channels within said other time slots, substantially all of said carrier frequencies belong to said frequency-hopping sequence, and each time slot which is simultaneous with said at least one predetermined time slot is blocked from being used for transmitting traffic by at least one said second transceiver of at least one said base station, for reducing interference exposure of control channels of other said radio cells of said system.

9. The cellular network system of claim 8, wherein:

said at least some of said radio cells includes all of said radio cells.

* * * * *